United States Patent
Chou

(10) Patent No.: US 9,611,078 B2
(45) Date of Patent: Apr. 4, 2017

(54) ONE-PIECE FOOD CONTAINER WITH RIM

(71) Applicant: Chia-Hao Chou, Taipei (TW)

(72) Inventor: Chia-Hao Chou, Taipei (TW)

( * ) Notice: Subject to any disclaimer, the term of this patent is extended or adjusted under 35 U.S.C. 154(b) by 0 days.

(21) Appl. No.: 15/168,593

(22) Filed: May 31, 2016

(65) Prior Publication Data

US 2016/0272378 A1 Sep. 22, 2016

Related U.S. Application Data

(62) Division of application No. 14/597,421, filed on Jan. 15, 2015, now Pat. No. 9,469,446.

(51) Int. Cl.
*B65D 43/04* (2006.01)
*B65D 43/02* (2006.01)
(Continued)

(52) U.S. Cl.
CPC ....... *B65D 43/0235* (2013.01); *B65D 43/021* (2013.01); *B65D 43/06* (2013.01); *B65D 51/22* (2013.01); *B65D 77/2092* (2013.01); *B65D 2101/0015* (2013.01); *B65D 2101/0092* (2013.01); *B65D 2543/0062* (2013.01); *B65D 2543/00092* (2013.01); *B65D 2543/00194* (2013.01); *B65D 2543/00296* (2013.01); *B65D 2543/00351* (2013.01); *B65D 2543/00425* (2013.01); *B65D 2543/00555* (2013.01); *B65D 2543/00685* (2013.01); *B65D 2543/00731* (2013.01); *B65D 2543/00796* (2013.01);
(Continued)

(58) Field of Classification Search
CPC ................ B65D 43/0235; B65D 43/06; B65D 2543/00833; B65D 2101/0015; B65D 2101/0092; B65D 43/021; B65D 77/2092; B65D 51/22; B65D 2543/0062; B65D 2543/00296; B65D 2543/00351; B65D 2543/00425; B65D 2543/00555; B65D 2543/00092; B65D 2543/00685; B65D 2543/00731; B65D 2543/00796; B65D 2543/00842; B65D 2543/00194; B65D 51/185; Y02W 30/807
USPC ....... 220/677, 678, 612, 613, 625, 266, 793, 220/270, 276, 359.1–359.4, 789, 791; 215/232
See application file for complete search history.

(56) References Cited

U.S. PATENT DOCUMENTS 3,773,207 A * 11/1973 Dokoupil ........... B65D 43/0254
220/266
4,488,658 A * 12/1984 Smith ................ B65D 43/0289
220/270
(Continued)

*Primary Examiner* — James N Smalley
(74) *Attorney, Agent, or Firm* — Rosenberg, Klein & Lee

(57) ABSTRACT

A food container has a temporary rim formed in one-piece structure on the edge thereof. It has as first sealing rim and a second sealing rim as the surface for a sealing film to be heat-sealed thereon. When the outer rim is torn off, an irreversible tear-off structure on the sealed cover would leave the trace, allowing the consumers and the sellers to decide whether to purchase or dispose of the goods simply by visual judgments; in other words, it has a tamper-proof function. In addition, when the outer rim is removed from the container, the sealing film would detach from the first sealing rim but still stick on the second sealing rim, providing a reusable sealed cover for the container that ensures more safety of food hygiene.

2 Claims, 15 Drawing Sheets

(51) Int. Cl.
 *B65D 51/22* (2006.01)
 *B65D 77/20* (2006.01)
 *B65D 43/06* (2006.01)

(52) U.S. Cl.
 CPC .............. *B65D 2543/00833* (2013.01); *B65D 2543/00842* (2013.01); *Y02W 30/807* (2015.05)

(56) References Cited

U.S. PATENT DOCUMENTS

2005/0184070 A1* 8/2005 Boback ................ B65D 43/021
 220/266
2008/0302798 A1* 12/2008 Foldesi, Sr. ........... B65B 7/2878
 220/276
2013/0300028 A1* 11/2013 Naber ................... B29C 45/006
 264/242

* cited by examiner

ONE-PIECE FOOD CONTAINER WITH RIM

This patent application is a divisional application of co-pending application Ser. No. 14/597,421 filed on Jan. 15, 2015, currently pending.

BACKGROUND OF THE INVENTION

1. Field of the Invention

The present invention relates to a one-piece food container, particularly to one that has a surface around the edge of the outer rim thereof for a pre-determined sealing film to be heat-sealed thereon in order to form an irreversible tear-off structure, and when the outer rim edge is torn off, the sealing film would not detach from it, providing a reusable and tamper-proof sealed cover for the container.

2. Description of the Related Art

Plastic containers made by vacuum molding have different shapes like boxes, cups and bowls since the amount of materials needed for manufacturing is little; therefore they are suitable for preserving food. However, non-solid food such as jelly, puddings and panna cotta may leak or seep through during transportation and moving. In order to prevent from leakage or seepage, the containers must be completely sealed.

FIG. 1 is a conventional food container with a sealed cover 10. It has liquid food 12 therein and a sealing film or aluminum foil sheet 13 sealed thereon. Such structure can indeed prevent from leakage during transportation and moving of the goods, but after the sealing film or aluminum foil sheet 13 is torn off, the container 11 is no longer available for sealed preservation. FIG. 2 is a conventional food container with a detachable lid 20 disclosed in U.S. Pat. No. 6,168,044. It comprises a bowl 21 and at least one selectively detachable snap 23 on a lid 22. A distinct clicking sound can be heard when combining the bowl 21 and the lid 22, forming a reusable structure. Nevertheless, the invention itself still cannot provide any tamper-proof function and therefore needs extra package to complement the concern; and the extra materials, volumes and weight for the complementary package would cause an increase of costs in transportation, preservation, working personnel, and facilities. Also, it does no good to the environment either. On the other hand, the lid 22 is made by hard materials and is difficult for related information of the food to be printed on. Thus, an extra step of adhering stickers is necessary in the manufacturing process, causing other inconveniences and increasing of costs as well.

In summary, the defect of the food container with a sealed cover 10 can be overcome by the structure of the food container with a detachable lid 20 and vice versa; however, the advantages of both cannot be combined and embodied in one single food container. Therefore, there is still room for improvements.

SUMMARY OF THE INVENTION

It is a primary object of the present invention to provide a one-piece food container with rim that has the rim thereof temporarily connected to the outer rim with the container by a tear-off structure which is irreversible so that the consumers and the sellers can decide whether to purchase or to dispose of the goods simply by visual judgments. Besides, it also has a surface on the edge of the container for a sealing film to be heat-sealed thereon; when the outer rim is torn off, the sealing film would still stick on the sealing rim of the outer rim, providing a reusable sealed cover for the container that preserves the advantages of conventional food containers with a sealed cover or with a detachable lid, and overcomes the shortcomings of both, further ensures more safety of food hygiene and provides a cost-effective and convenient manufacturing process with an extra benefit of better environmental protection.

Another object of the present invention is to provide a one-piece food container with rim that has the sealing rim thereof supporting a plastic hard cover when not having a sealing film heat-sealed thereon, for the plastic hard cover to be steadily placed thereon and protect the opening of the container, so as to achieve the expanding function of being applicable for both sealed covers and plastic hard covers.

In order to achieve the objects, the present invention comprises a container formed by a bottom, a peripheral wall extending upwardly from the edge of said bottom, and an opening being surrounded by said peripheral wall and having a first sealing rim surrounding the top edge of said opening and forming a first edge downwardly from the far edge of said first sealing rim; an outer rim formed in one-piece on the far edge of the first edge, having a second edge arranged next to said first edge and a second sealing rim surrounding said first sealing rim and forming a third edge downwardly from the far edge of said second sealing rim; and a tear-off structure arranged along the link between the first edge and the second edge with a plurality of dividing dotted lines arranged regularly as the bottom end of the second edge sticking to a pre-determined position on the first edge, connecting the outer rim with the container temporarily and therefore forming a one-piece container with rim;

whereby the tear-off structure is irreversible and allows the consumers and the sellers to decide whether to purchase or to dispose of the goods simply by visual judgments.

With the structures disclosed above, the present invention may further comprises a sealed cover formed by a sealing film being heat-sealed on the surface of the second sealing rim which would not detach when the outer rim is removed, forming an reusable structure that can cover the opening of the container repeatedly by having the sealing film abutting on the first sealing rim. Furthermore, the bottom edge of the third edge has at least one first tab in an arc shape and having a plurality of first protruding ridges on the surface thereof.

Also, the present invention may further comprise a plastic hard cover with a flange extending from the bottom edge thereof, and the flange has a covering edge extending from and surrounding the far edge of the plastic hard cover so that the flange is able to engage a concave groove on the periphery wall, resulting the surface of the covering edge covering on the first and second sealing rim with the outer flange of the covering edge at least partially covering the third edge for the plastic hard cover to be steadily placed thereon and protect the opening of the container.

With the structures disclosed above, the bottom edge of the covering flange thereof has at least one second tab in an arc shape and having a plurality of second protruding ridges on the surface thereof.

In a preferred embodiment, the present invention comprises a container formed by a bottom, a peripheral wall extending upwardly from the edge of said bottom, and an opening being surrounded by said peripheral wall and having a first sealing rim surrounding the top edge of said opening and forming a first edge downwardly from the far edge of said first sealing rim; an outer rim formed in one-piece on the far edge of the first edge, having a second edge arranged next to said first edge and a second sealing rim at the same height of said first sealing rim and forming a third edge downwardly from the far edge of said second sealing rim; and a tear-off structure arranged along the link between the first edge and the second edge at the bottom thereof with a plurality of dividing dotted lines arranged regularly, connecting the outer rim with the container temporarily and therefore forming a one-piece container with rim;

whereby the surface composed by the neighboring first and second sealing rim becomes the place for a sealing film to be heat-sealed thereon, forming an irreversible tear-off structure that allows the consumers and the sellers to decide whether to purchase or to dispose of the goods simply by visual judgments; when the outer rim is removed, the heat-sealed sealing film would not be torn off from the surface of the second sealing rim but would detach from the surface of the first sealing rim, forming an reusable structure that can cover the opening of the container repeatedly.

In another preferred embodiment, the present invention comprises a container formed by a bottom, a peripheral wall extending upwardly from the edge of said bottom, and an opening being surrounded by said peripheral wall and having a first sealing rim surrounding the top edge of said opening and forming a first edge downwardly from the far edge of said first sealing rim; an outer rim formed in one-piece on the far edge of the first edge, having a second edge arranged next to said first edge and a second sealing rim surrounding said first sealing rim and forming a third edge downwardly from the far edge of said second sealing rim; and a tear-off structure arranged along the link between the first edge and the second edge with a plurality of dividing dotted lines arranged regularly as the bottom end of the second edge sticking to the middle section of the first edge, resulting the second sealing rim being displaced higher than the first sealing rim, connecting the outer rim with the container temporarily and therefore forming a one-piece container with rim;

whereby the surface of the second sealing rim becomes the place for a sealing film to be heat-sealed thereon, forming an irreversible tear-off structure that allows the consumers and the sellers to decide whether to purchase or dispose of the goods simply by visual judgments; when the outer rim is removed, the heat-sealed sealing film would detach from the edge of the container but would not be torn off from the surface of the second sealing rim, forming an reusable structure that can cover the opening of the container repeatedly.

In short, the present invention has reusable and tamper-proof functions with the sealed cover and the tear-off structure. It also ensures more safety of food hygiene with the innovative technology of covers and lower costs for personnel, manufacturing facilities, transportation, and storage by largely reducing the raw materials, volumes, and weights for packaging, providing an extra benefit of better environmental protection as well.

DETAILED DESCRIPTION OF THE PREFERRED EMBODIMENT

Figure 1:
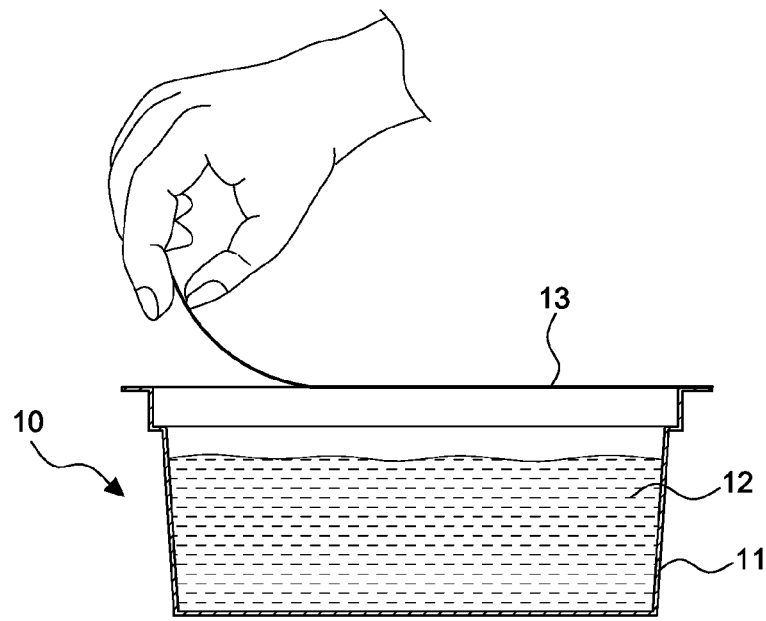
FIG. 1 is a schematic diagram of a conventional food container with a sealed cover.
Figure 2:
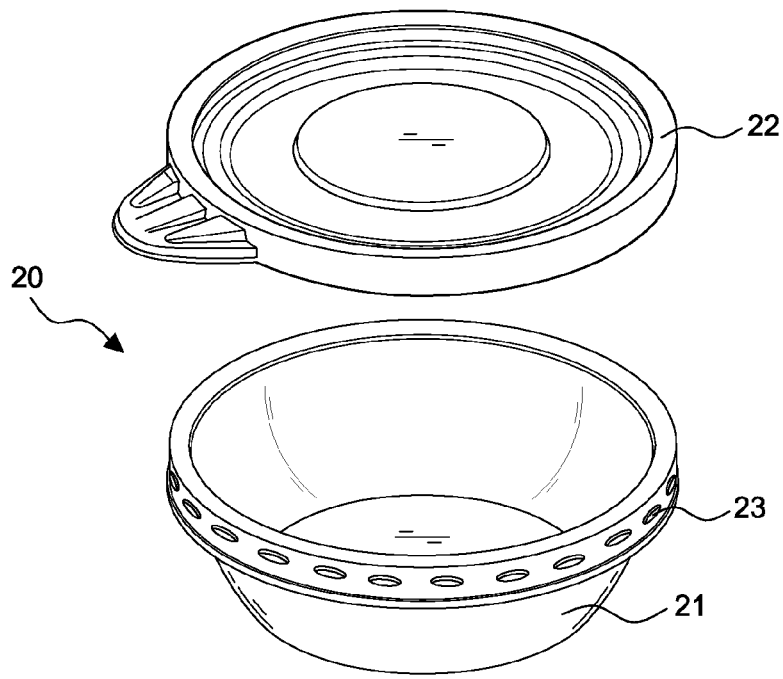
FIG. 2 is a schematic diagram of a conventional food container with a detachable lid.
Figure 3A:
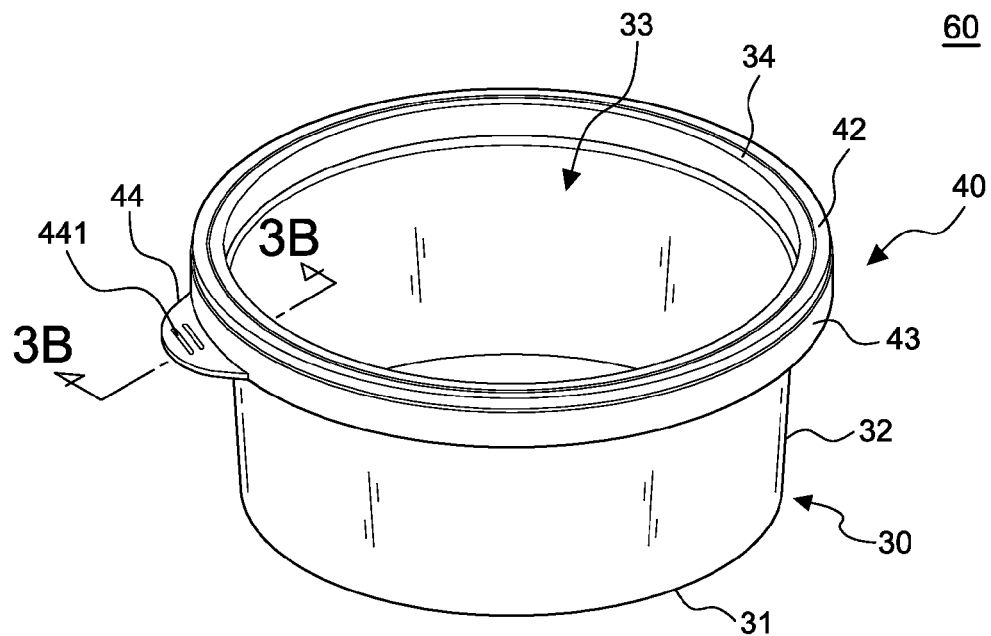
FIG. 3A is a front perspective view of the present invention.
Figure 3B:
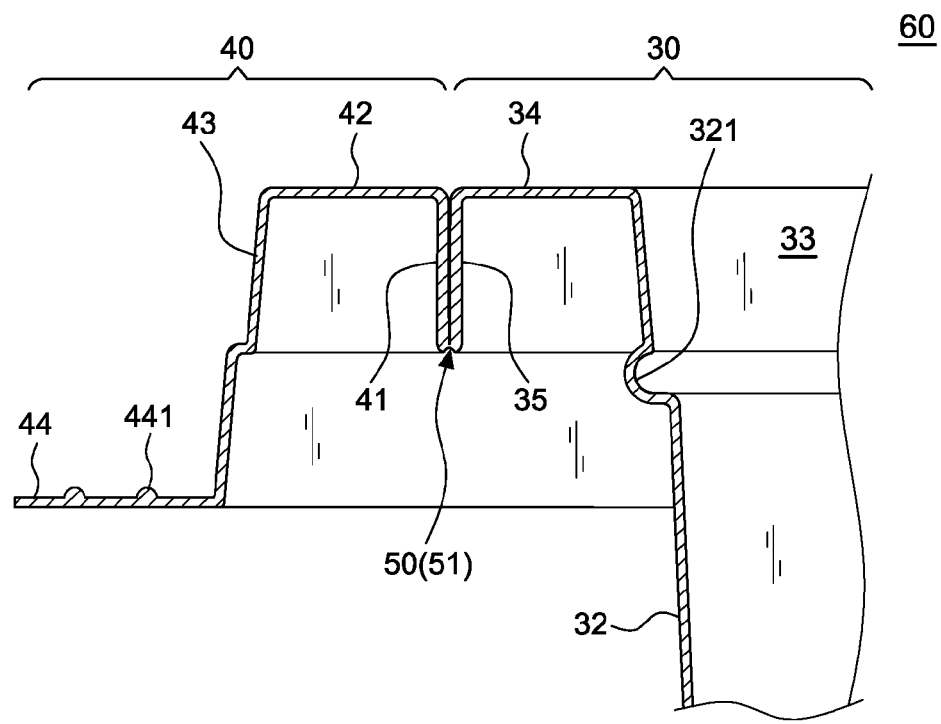
FIG. 3B is a sectional view along line 3B-3B in FIG. 3A.

Referring to FIGS. 3A-17, in a preferred embodiment, the present invention comprises a container 30, an outer rim 40, and a tear-off structure 50.

The container 30 is formed by a bottom 31, a peripheral wall 32 extending upwardly from the edge of said bottom 31, and an opening 33 being surrounded by said peripheral wall 32. The opening 33 has a first sealing rim 34 surrounding the top edge thereof and forming a first edge 35 downwardly from the far edge of said first sealing rim 34.

The outer rim 40 is formed in one-piece on the far edge of the first edge 35. It has a second edge 41 arranged next to the first edge 35 and a second sealing rim 42 surrounding the first sealing rim 34 and forming a third edge 43 downwardly from the far edge of said second sealing rim 42. In this embodiment, the bottom edge of the third edge 43 has at least one first tab 44 in an arc shape and having a plurality of first protruding ridges 441 on the surface thereof.(A second tab 73B having a plurality of first protruding ridges 731B on the surface thereof are shown in the plastic hard cover 70B of the embodiment illustrated in FIGS. 13-16.)

Figure 4:
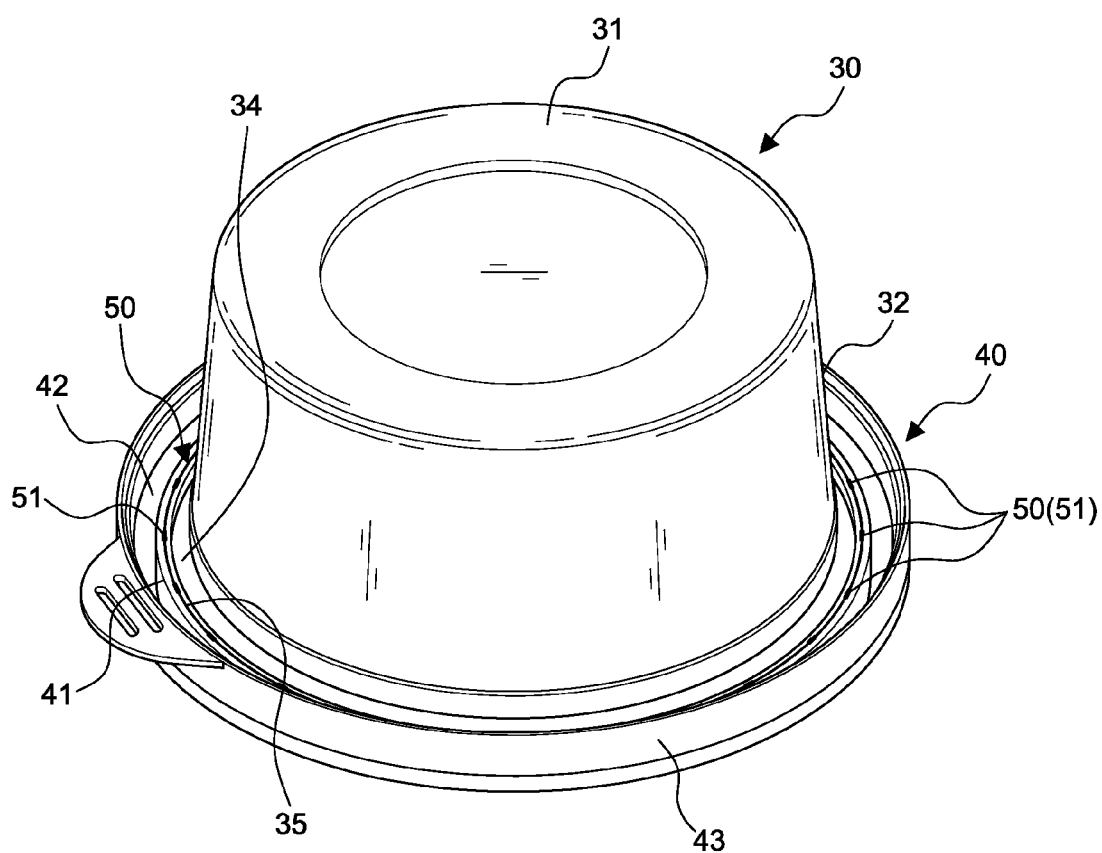
FIG. 4 is an inverted perspective view of the present invention.
Figure 5:
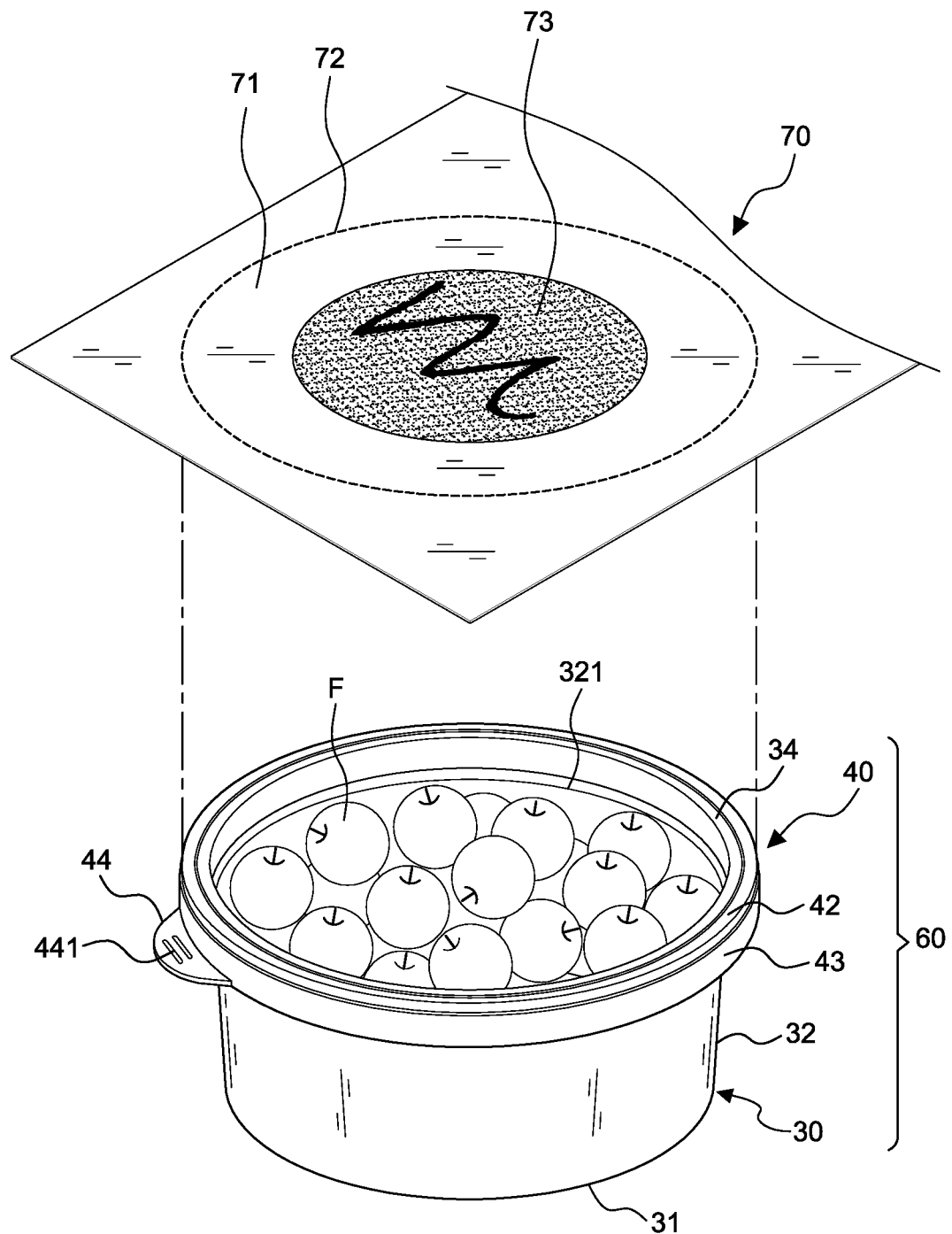
FIG. 5 is a schematic diagram illustrating the sealing film to be heat-sealed on the first and second sealing rim of the present invention.
Figure 9A:
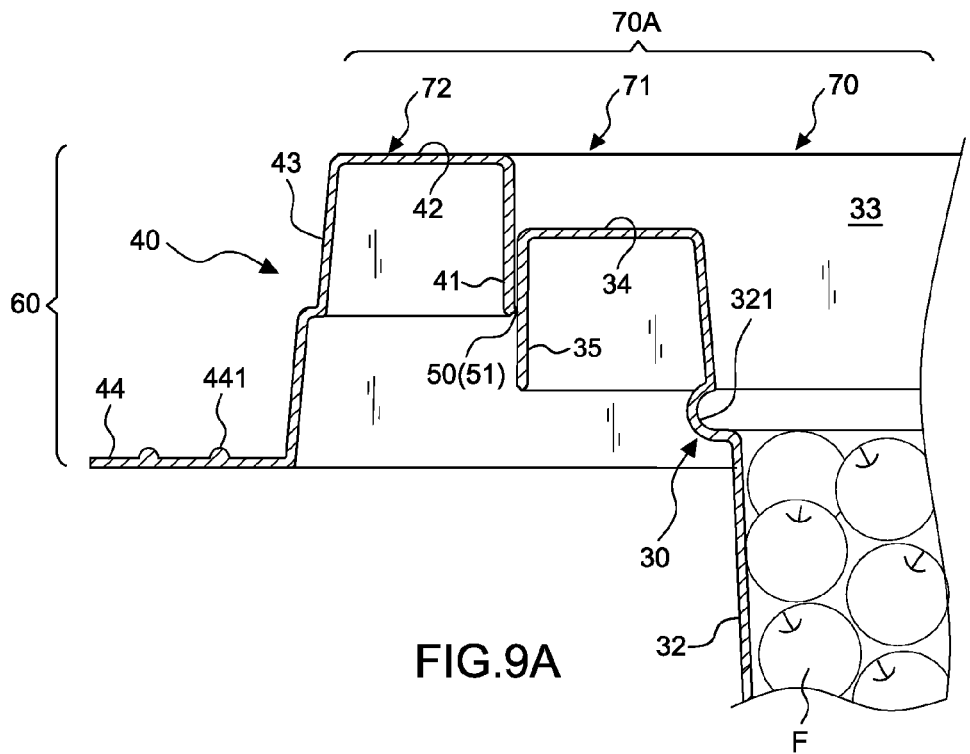
FIG. 9A is an applicable embodiment of the sealing rim of the present invention with the tear-off structure remaining intact.
Figure 9B:
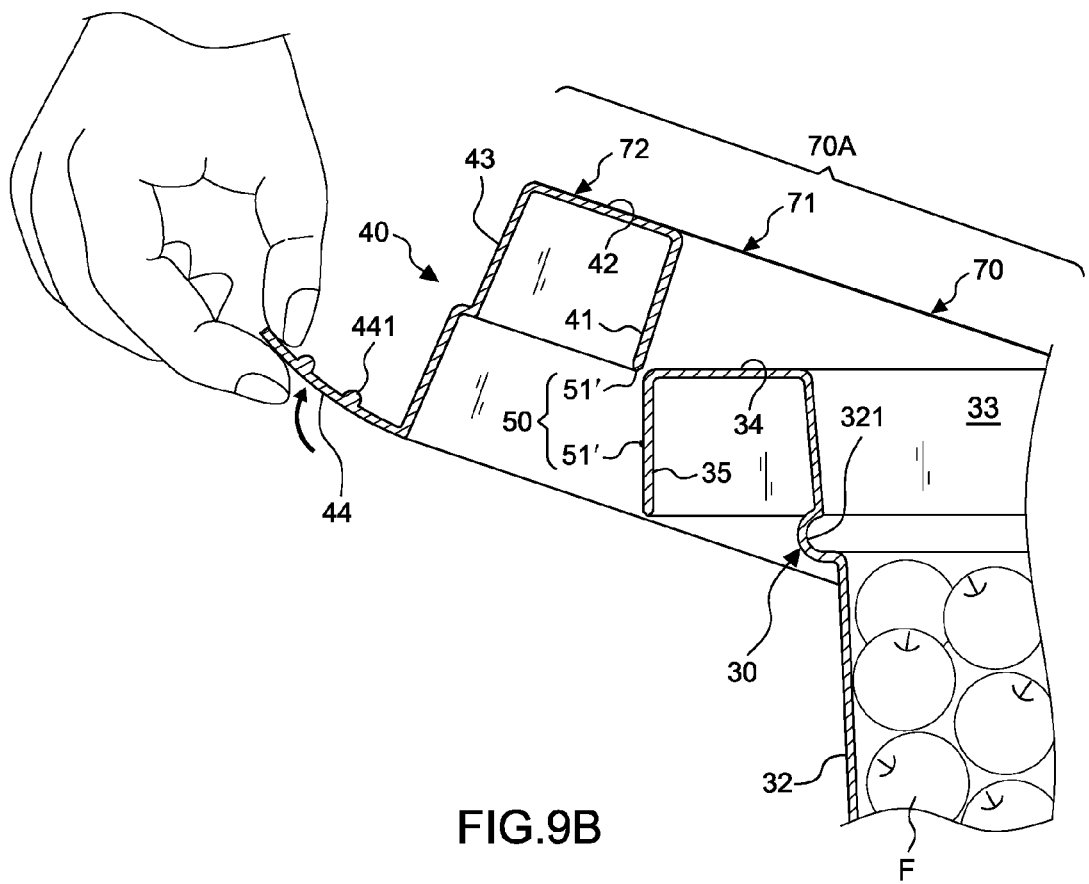
FIG. 9B is a schematic diagram illustrating the tear-off structure in FIG. 9A being torn off.
Figure 10:
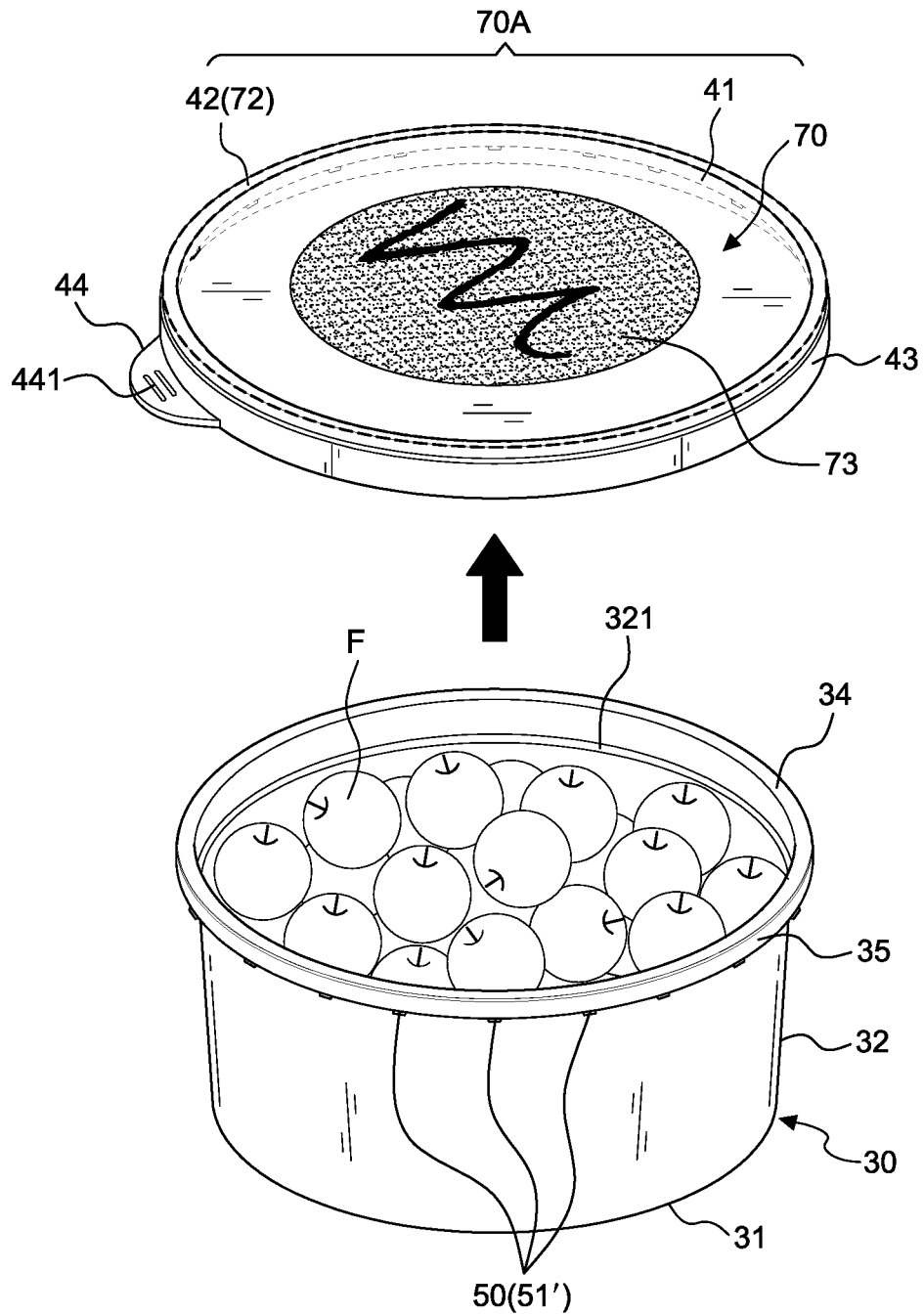
FIG. 10 is a schematic diagram illustrating the sealed cover of the present invention being removed from the container.
Figure 11:
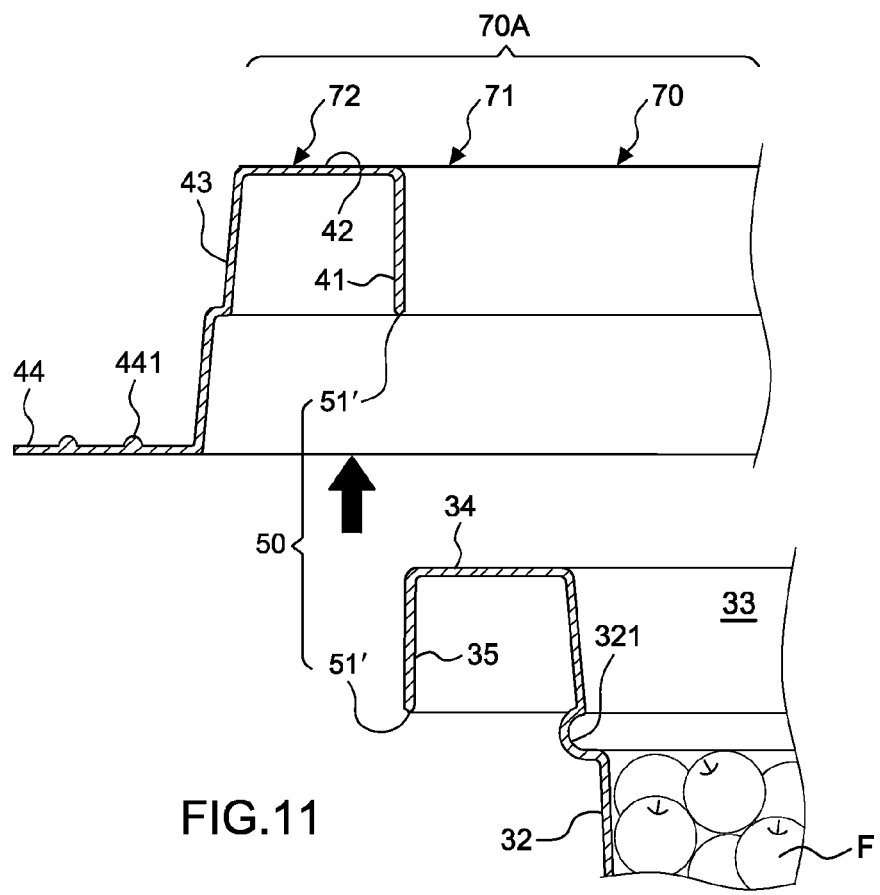
FIG. 11 is a partially enlarged view of FIG. 10.

As shown in FIG. 4, the tear-off structure is arranged along the link between the first edge 35 and the second edge 41 with a plurality of dividing dotted lines 51 arranged regularly. The bottom end of the second edge 41 is sticking to a pre-determined position on the first edge 35—in this embodiment, the bottom; and preferably the first and second sealing rim 34, 42 are arranged at the same height but the present invention is not limited to such application. In an applicable embodiment as shown in FIGS. 9A and 9B, the bottom end of the second edge 41 is sticking to the middle section of the first edge 35; that is, the second sealing rim 42 is arranged higher than the first sealing rim 34. Either of the embodiments is applicable in connecting the outer rim 40 with the container 30 temporarily and therefore forming a one-piece container with rim 60. Such structures are the main features of the present invention. The container 30 and the outer rim 40 thereof are manufactured in factories as a temporarily connected one-piece structure. Then they are transported to the stores and food factories, and the container 30 would be filled with the food F as shown in FIG. 5 and then have a pre-determined sealing film 70 to be heat-sealed thereon by a sealing machine (not shown). The structures and principle of sealing machines belong to the prior art and the machines are already commonly seen in food factories and stores.

The main feature of the present invention lies in the design of the first sealing rim 34 and the second sealing rim 42 on the container 30 and the outer rim 40 respectively. When the sealing film 70 is heat-sealed on the container 30 and the temporary outer rim 40 as in FIG. 6 and the second sealing rim 42 is at the same height of the first sealing rim 34 as in FIG. 8A, the outer loop 72 of the sealing film 70 is heat-sealed on the second sealing rim 42 and the inner loop 71 arranged next to the outer loop 72 is heat-sealed on the first sealing rim 34. With both sealing rims safely sealed, the food F inside the container 30, liquid or solid, would not leak or fall out during transportation and movements, further ensuring safety and food hygiene. Or when the second sealing rim 42 is arranged higher than the first sealing rim 34 as illustrated in FIG. 9A, the sealing film 70 still has the outer loop 72 thereof heat-sealed on the second sealing rim 42; with such structure, all kinds of non-liquid food F are also safely preserved inside during the transportation and movements.

Figure 6:
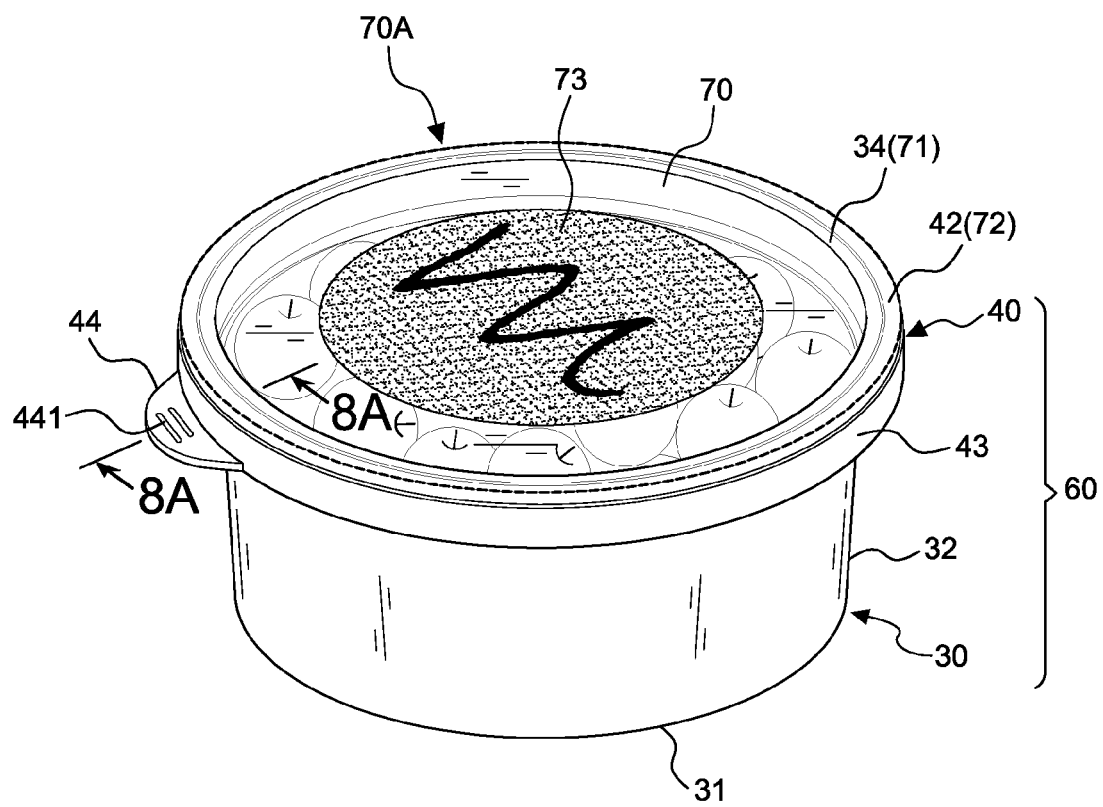
FIG. 6 is a schematic diagram of the present invention with the sealing film being heat-sealed on the first and second sealing rim thereof.

Referring to FIG. 6, another expanding feature of the present invention is to allow the owners of the stores and the food factories to print their trademarks or any other information on the sealing rim 70 in advance, saving the time and personnel of adhering stickers on detachable lids in the manufacturing process.

Figure 7:
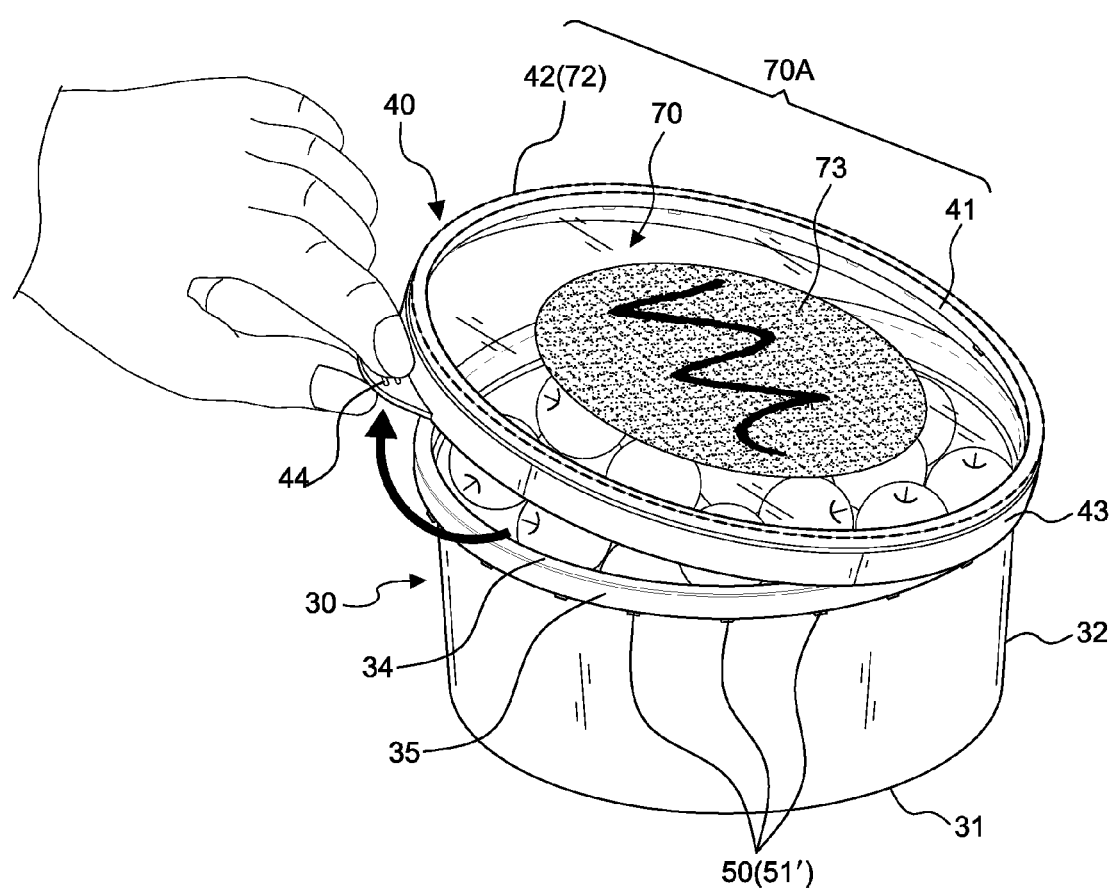
FIG. 7 is a schematic diagram illustrating the sealed cover being removed from the container.
Figure 8A:
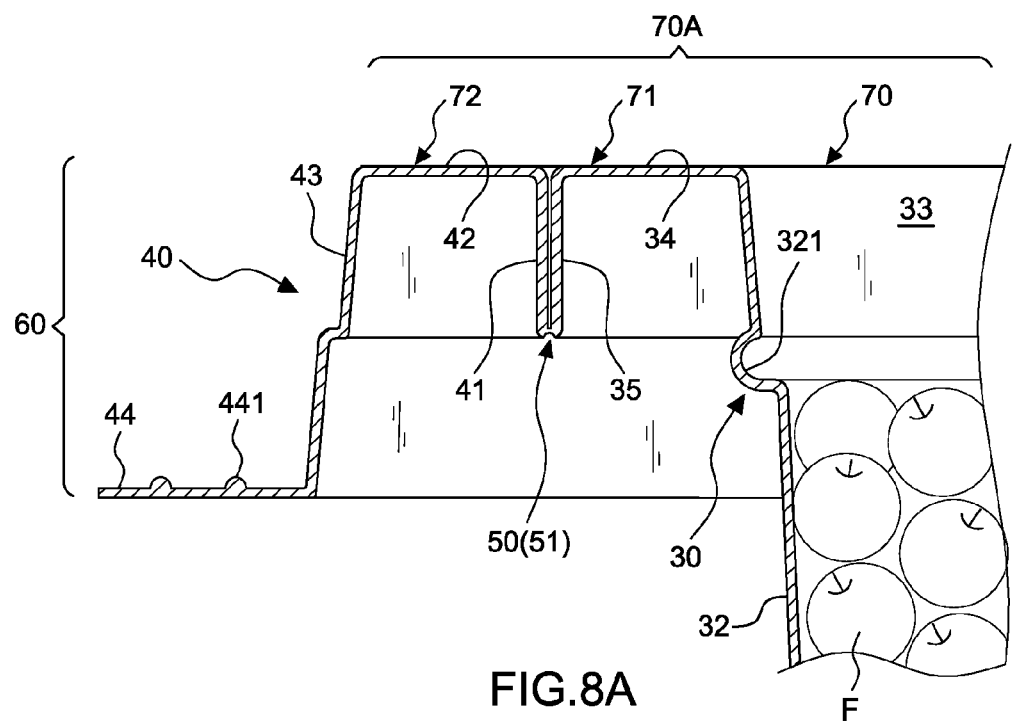
FIG. 8A is a sectional view along line 8A-8A in FIG. 6, showing the tear-off structure remaining intact.
Figure 8B:
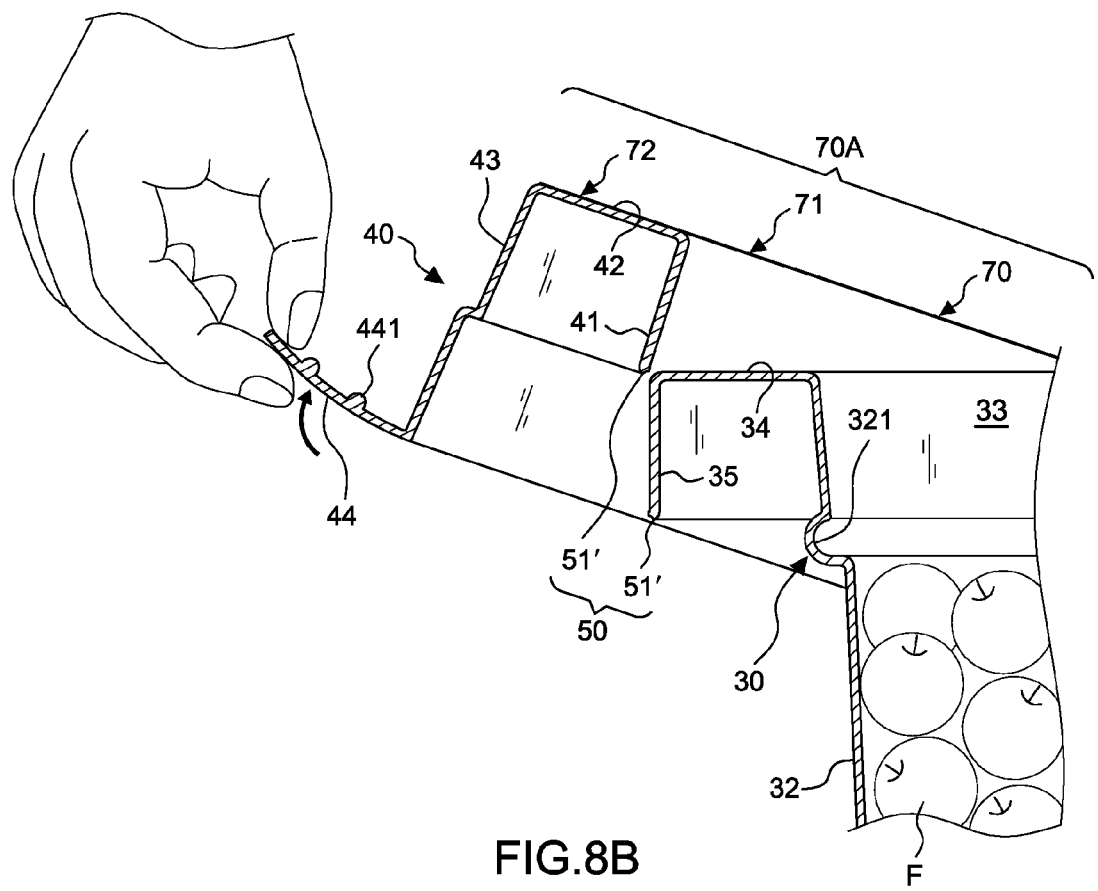
FIG. 8B is a schematic diagram illustrating the tear-off structure in FIG. 8A being torn off.

Now referring to FIG. 7, when the consumers want to enjoy the food F inside the container 30, simply pull the first tab 44 upwardly and the plurality of dotted lines 51' of the tear-off structure 50 would be torn by the shearing force of the pull, forming a plurality of torn lines 51' that removes the temporary outer rim 40 from the container 30 whether the second sealing rim 42 is at the same height as the first sealing rim 34 as in FIG. 8B or higher than it as in FIG. 9B. Meanwhile, with reference to FIGS. 10 and 11, the outer loop 72 of the sealing film 70 would still stick to the outer rim 40 due to the heat-sealing, thus forming a detachable sealed cover 70A.

Figure 12:
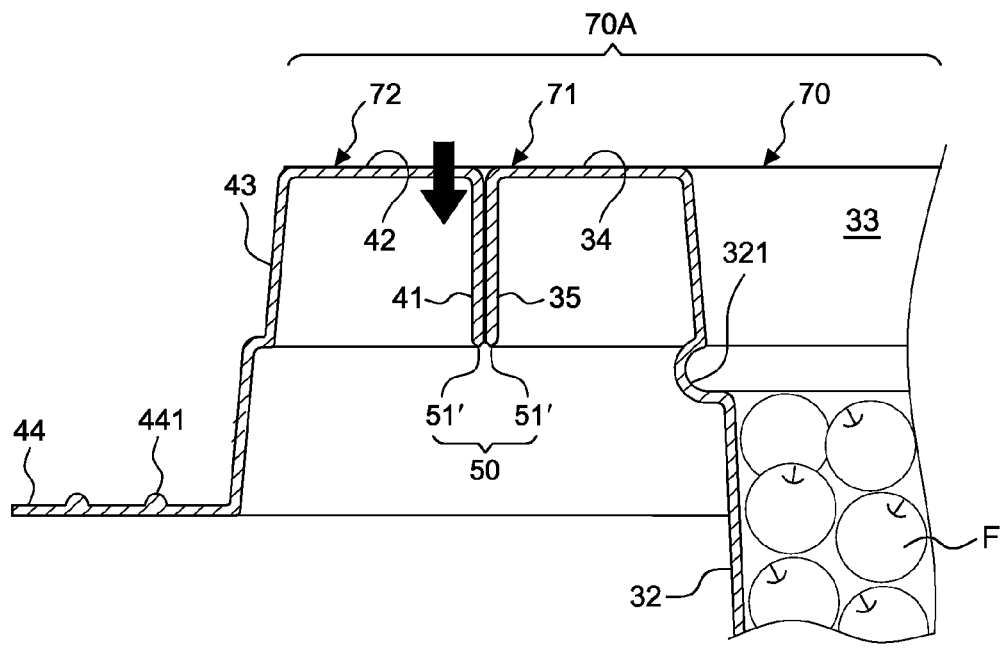
FIG. 12 is a schematic diagram illustrating the sealed cover in FIG. 10 re-covering onto the container.
Figure 13:
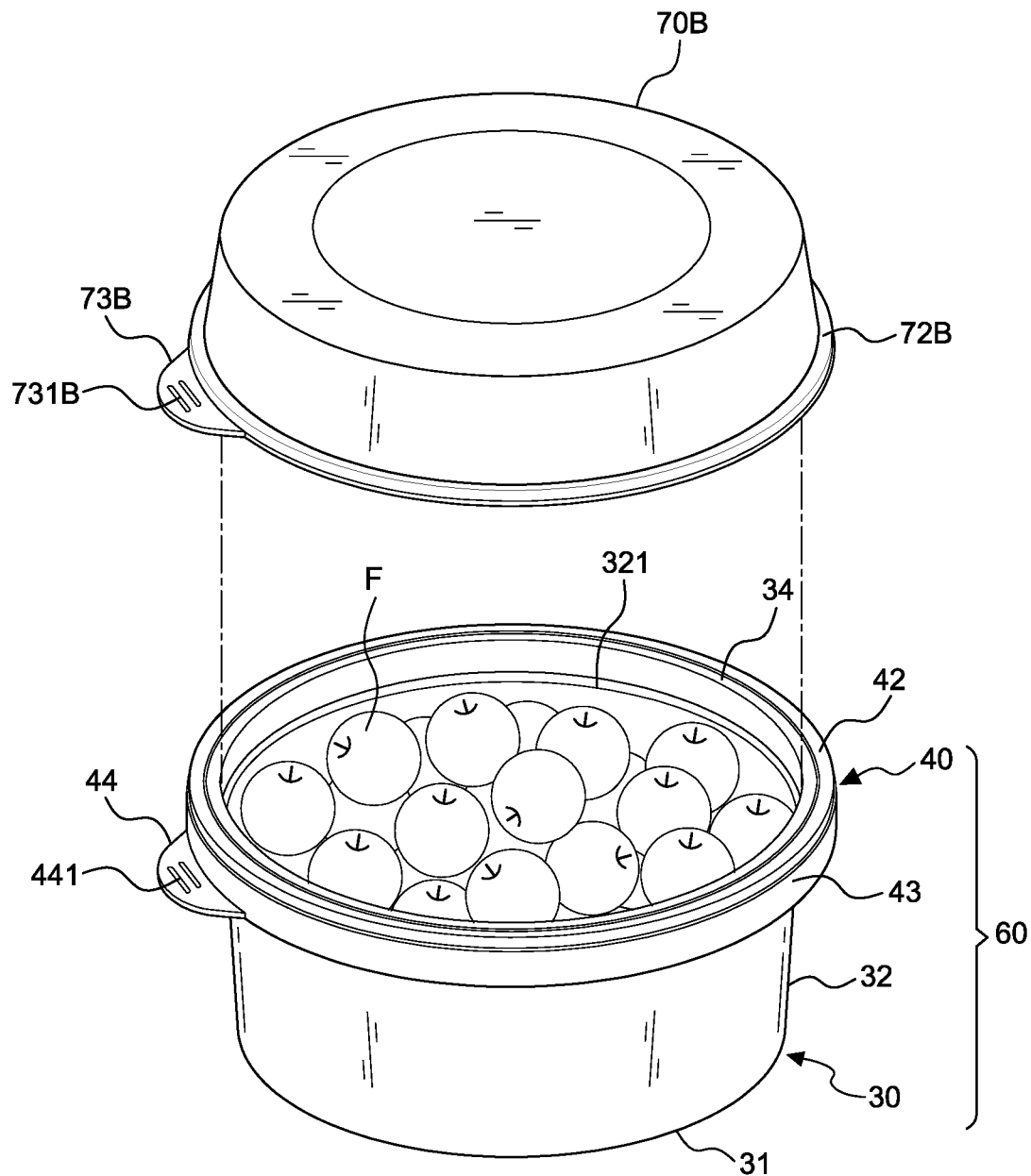
FIG. 13 is another applicable embodiment of the present invention with a plastic hard cover.
Figure 14:
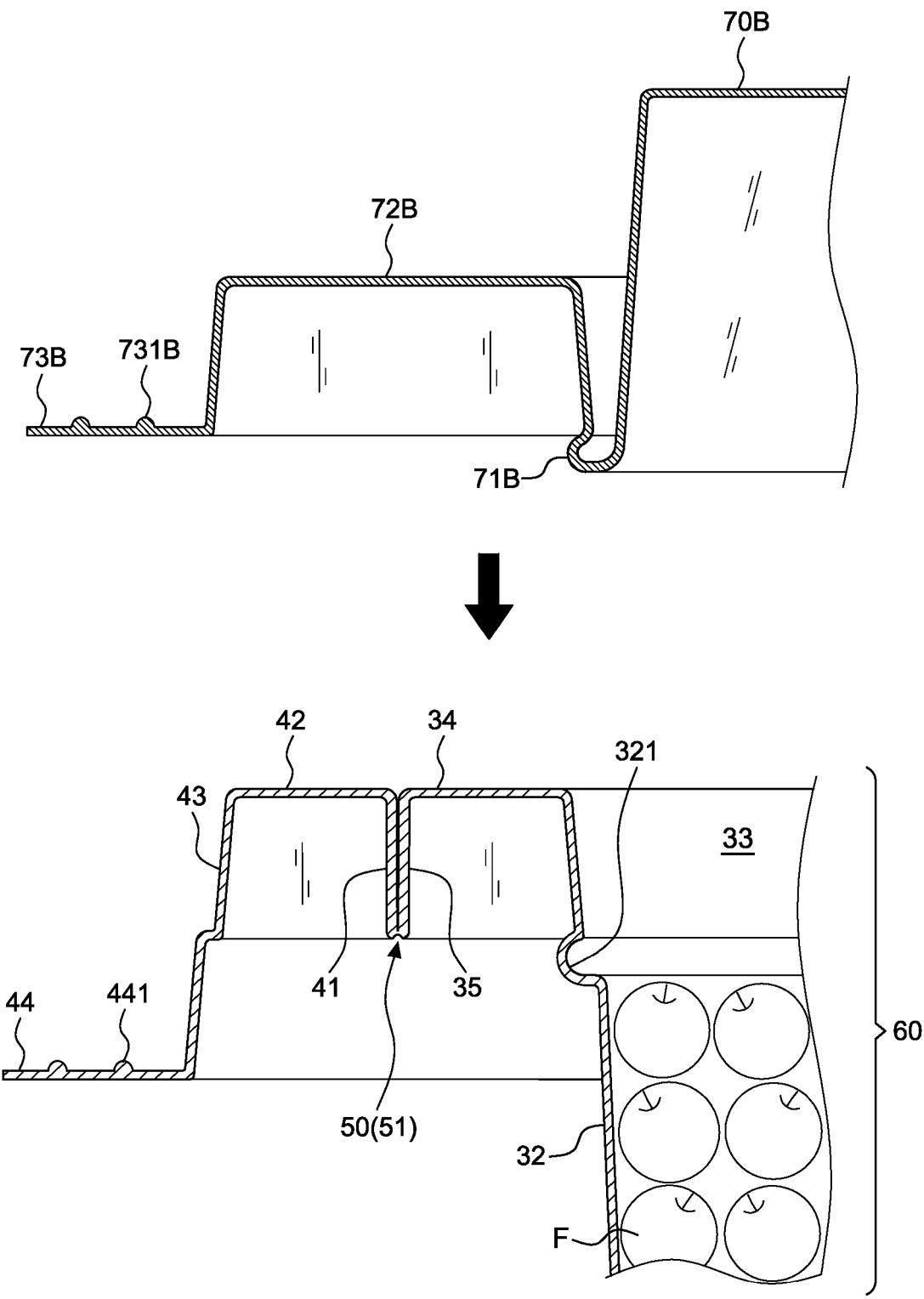
FIG. 14 is a sectional view of illustrating a partial structure of the plastic hard cover in FIG. 13 to be covered on the container.
Figure 15:
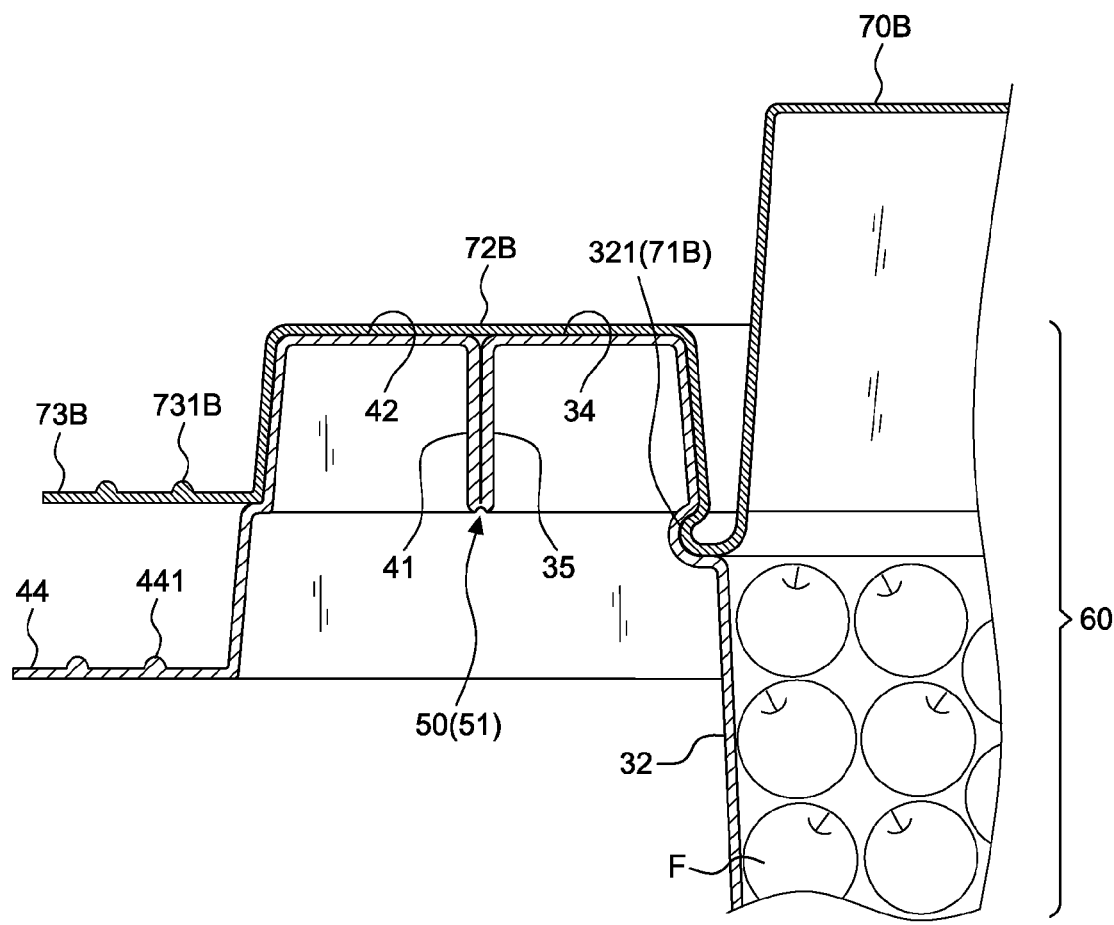
FIG. 15 is a sectional view of illustrating a partial structure of the plastic hard cover in FIG. 14 being covered on the container.
Figure 16:
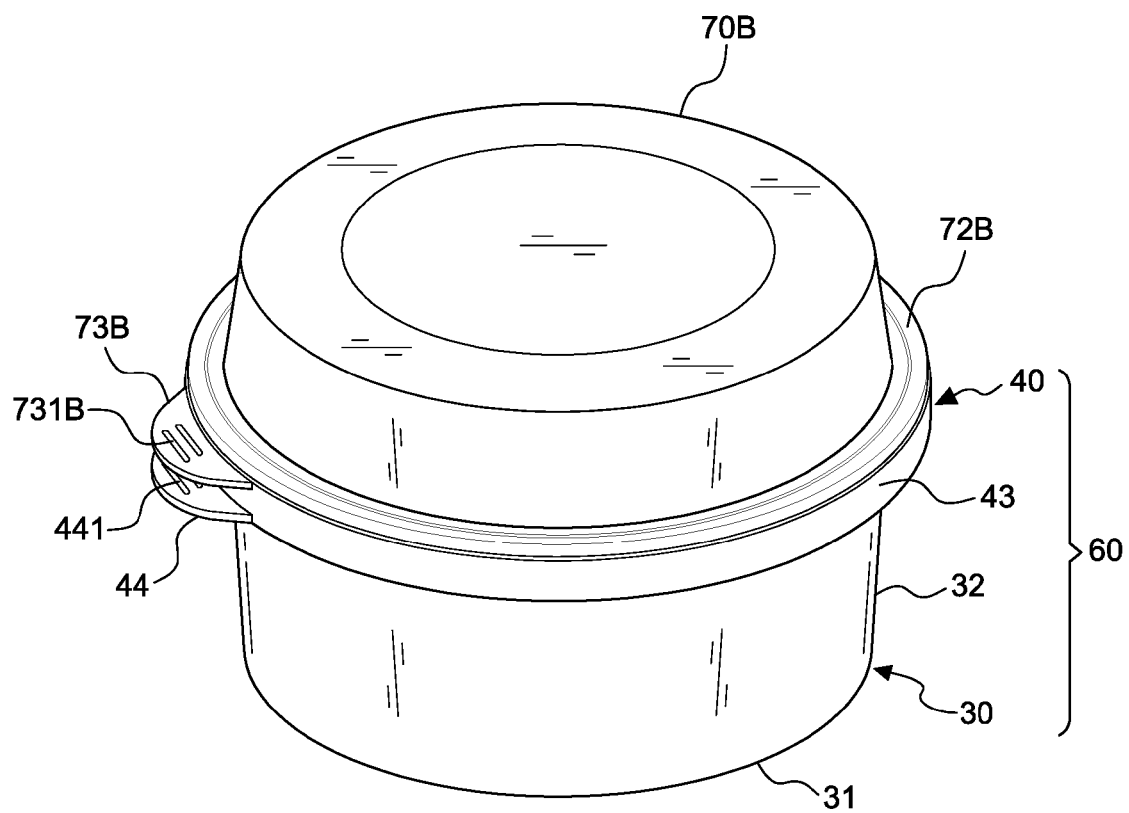
FIG. 16 is a perspective view of the present invention with the plastic hard cover.

Further referring to FIG. 12, when the sealed cover 70A is recovering onto the container 30, the inner loop 71 thereof would be placed on the first sealing rim 34 due to gravity, matching the torn lines 51' along the second edge 41 and the first edge 35 and functioning as a cover if there is food F left inside the container 30. This ensures more safety of food hygiene and allows the food F inside container 30 to be preserved in the refrigerators. More importantly, such structure is irreversible, therefore allows the consumers and the sellers to distinguish the intactness of the goods simply by visual judgments; in other words, it has a tamper-proof function as well.

Another applicable embodiment of the present invention is illustrated in FIGS. 13, 14, 15, and 16. Basically it retains the features of the former embodiment; the difference lies in the design of a concave groove 321 arranged on the inside of the peripheral wall 32, roughly corresponding to the height of the first edge 35, and a plastic hard cover 70B with a flange 71B extending from the bottom edge thereof, and the flange 71B has a covering edge 72B extending from and surrounding the far edge of the plastic hard cover 70B so that the flange 71B is able to engage the concave groove 321 on the periphery wall 32, resulting the surface of the covering edge 72B covering the first and second sealing rim 34, 42 with the outer flange of the covering edge 72B at least partially covering the third edge 43 for the plastic hard cover 70B to be steadily placed thereon and protect the opening 33 of the container 30.

Figure 17:
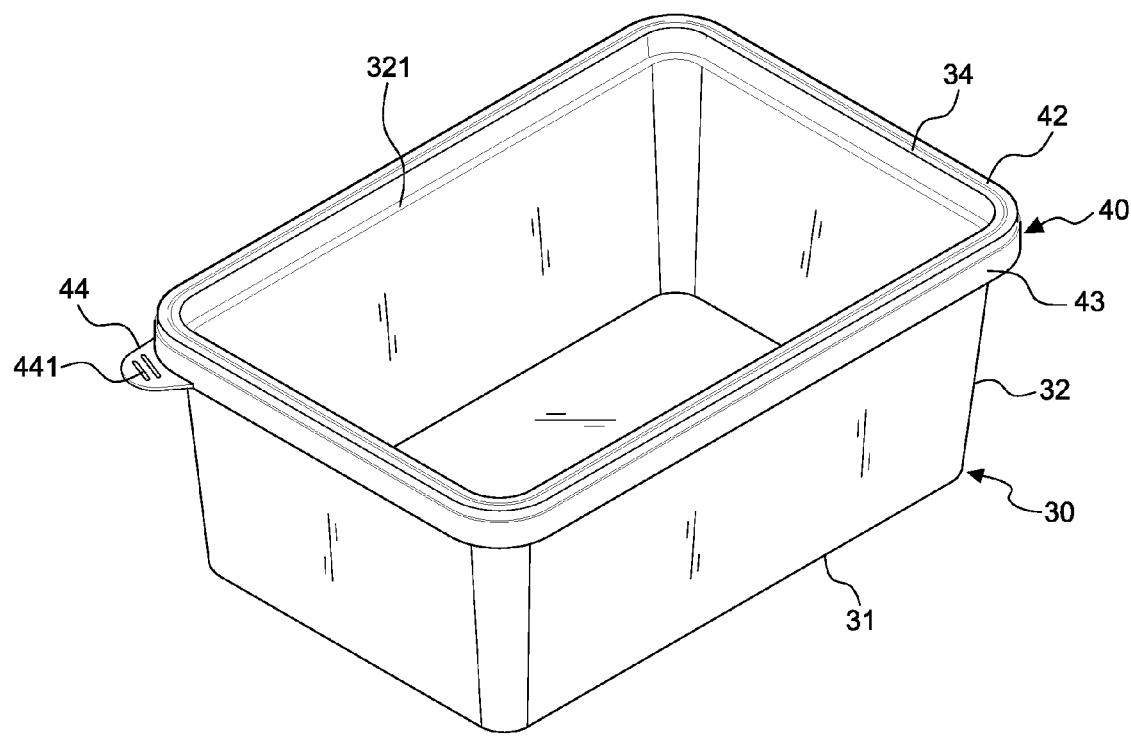
FIG. 17 is a perspective view of the present invention in another form of container.

Additionally, the container 30 of the present invention is in a round shape in the embodiments but is not limited to such shape. It can also be in a rectangle shape as shown in FIG. 17 or in any other shape with the same structures and structures.

With the structures disclosed above, the present invention not only has a dual function of being tamper-proof and reusable but also provides an innovative technology in manufacturing the covers, ensuring more safety of food hygiene and reducing the prime costs and raw materials needed for manufacturing the covers with an extra benefit of better environmental protection.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A one-piece food container with rim, comprising:
   a container formed by a bottom, a peripheral wall extending upwardly from an edge of said bottom, and an opening surrounded by said peripheral wall, and a first sealing rim surrounding a top edge of said opening and a first edge extending downwardly from a far edge of said first sealing rim;
   an outer rim formed in one-piece surrounding said first sealing rim, said outer rim having a second edge arranged next to said first edge and a second sealing rim surrounding said first sealing rim and a third edge extending downwardly from a far edge of said second sealing rim;
   a tear-off structure arranged between the first edge and the second edge with a plurality of angularly spaced connection portions frangibly joining bottom ends of the first and second edges, the outer rim thereby being removably connected with the container and forming a one-piece container with rim; and
   a plastic hard cover with a flange extending from the bottom edge thereof, the flange having a covering edge extending from the far edge of the plastic hard cover for the flange to be able to engage a concave groove on the peripheral wall, covering the surface of the covering edge on the first and second sealing rims with the outer flange of the covering edge at least partially covering the third edge for the plastic hard cover to be steadily placed on the container;
   whereby upon a user removing said outer rim from said container, the tear-off structure between said first and second edges is irreversibly served.

2. The one-piece food container with rim as claimed in claim 1 wherein the bottom edge of the covering flange has at least one second tab in an arc shape and having a plurality of second protruding ridges on the surface thereof.

\* \* \* \* \*